United States Patent [19]
Maus et al.

[11] Patent Number: 5,355,671
[45] Date of Patent: Oct. 18, 1994

[54] METHOD AND APPARATUS FOR MONITORING THE FUNCTION OF A CATALYTIC CONVERTER

[75] Inventors: Wolfgang Maus; Helmut Swars; Rolf Brück, all of Bergisch Gladbach, Fed. Rep. of Germany

[73] Assignee: Emitec Gesellschaft Für Emmissionstechnologie mbH, Lohmar, Fed. Rep. of Germany

[21] Appl. No.: 24,659

[22] Filed: Mar. 1, 1993

[30] Foreign Application Priority Data

Oct. 15, 1990 [DE] Fed. Rep. of Germany .... 4032721.3

[51] Int. Cl.$^5$ ................................................. F01N 3/00
[52] U.S. Cl. ........................................ 60/274; 60/277
[58] Field of Search ................................. 60/274, 277

[56] References Cited

U.S. PATENT DOCUMENTS

| | | | |
|---|---|---|---|
| 3,766,536 | 10/1973 | Hill | 340/229 |
| 4,721,084 | 1/1988 | Kawauake et al. | 123/440 |

FOREIGN PATENT DOCUMENTS

| | | |
|---|---|---|
| 0223058 | 5/1987 | European Pat. Off. . |
| 0236659 | 9/1987 | European Pat. Off. . |
| 0245737 | 11/1987 | European Pat. Off. . |
| 0260031 | 3/1988 | European Pat. Off. . |
| 0245738 | 8/1989 | European Pat. Off. . |
| 0383187 | 8/1990 | European Pat. Off. . |
| 2219073 | 11/1972 | Fed. Rep. of Germany . |
| 2330258 | 1/1975 | Fed. Rep. of Germany . |
| 2351828 | 4/1975 | Fed. Rep. of Germany . |
| 2346425 | 6/1977 | Fed. Rep. of Germany . |
| 2643739 | 3/1978 | Fed. Rep. of Germany . |
| 3513761 | 10/1986 | Fed. Rep. of Germany . |
| 3527175 | 2/1987 | Fed. Rep. of Germany . |
| 3710268 | 10/1988 | Fed. Rep. of Germany . |
| 3809082 | 10/1988 | Fed. Rep. of Germany . |
| 3811732 | 10/1989 | Fed. Rep. of Germany . |
| 4005803 | 8/1990 | Fed. Rep. of Germany . |
| 269673 | 7/1989 | German Democratic Rep. . |
| 8807622 | 10/1988 | World Int. Prop. O. . |
| 9006432 | 6/1990 | World Int. Prop. O. . |

*Primary Examiner*—Noah P. Kamen
*Attorney, Agent, or Firm*—Herbert L. Lerner; Laurence A. Greenberg

[57] ABSTRACT

A method for monitoring the status of a catalytic converter through which a catalyzable fluid, particularly an exhaust gas from an internal combustion engine, flows along a flow direction from an inlet end to an outlet end, includes measuring the temperature of the catalytic converter along the flow direction continuously or at a plurality of measurement points along the flow direction forming a mean temperature value. The temperature of the catalytic converter is measured at least at one measurement point forming an associated local temperature value. The mean temperature value is compared with the local temperature value for deriving a statement as to the status of the catalytic converter. An assembly for monitoring the status of a catalytic converter through which a catalyzable fluid can flow along a flow direction from an inlet end to an outlet end of the catalytic converter includes a first temperature measuring sensor including a length of wire having a temperature-variable electrical resistance and being coupled to the catalytic converter along the flow direction, and at least one second temperature measuring sensor being coupled to the catalytic converter at a measuring point.

20 Claims, 3 Drawing Sheets

METHOD AND APPARATUS FOR MONITORING THE FUNCTION OF A CATALYTIC CONVERTER

Cross-Reference to Related Application

This application is a continuation of International Application Ser. No. PCT/EP91/01583, filed Aug. 20, 1991.

BACKGROUND OF THE INVENTION

FIELD OF THE INVENTION

The invention relates to methods for monitoring the status of a catalytic converter through which a catalyzable fluid can flow, such as a catalytic converter in the exhaust system of an internal combustion engine, and catalysts for corresponding use that are especially suitable for monitoring according to the method of the invention.

In order to meet the increasingly stringent environmental protection regulations in many countries, internal combustion engines, especially motor vehicle engines, are increasingly being equipped with exhaust systems that are provided with catalytic converters for converting pollutants in their exhaust gases into harmless substances. The term catalytic converter is typically understood to mean a honeycomb-like body of metal or ceramic that has a number of channels through which exhaust gases, or other fluids that have catalyzable components, can flow. Each channel has a wall that is covered with a coating of catalytically active material, which is the catalyst itself. Metal catalytic converters are generally formed of structured sheet metal plates that are stacked, spirally wound, or otherwise intertwined. Such forms are described in Published European Application No. 0 223 058 B2, corresponding to U.S. Pat. No. 4,824,011; Published European Application No. 0 245 737 B2, corresponding to U.S. Pat. Nos. 4,832,998 and 4,923,109; or Published European Application No. 0 245 738 B2, corresponding to U.S. Pat. Nos. 4,803,189 and 4,946,822, for instance.

In order to assure the function of a catalytic converter in the exhaust system of an internal combustion engine, it is known to provide the catalytic converter with measuring sensors for monitoring the temperature, or the like, so that conclusions can be drawn from the measured values obtained as to its function during engine operation. Proposals along such lines can be found in German Published, Non-Prosecuted Application 26 43 739 A1, German Published, Non-Prosecuted Application 37 10 268 A1, and Published European Application No. 0 236 659 A1. The first two of those references propose equipping a catalytic converter with at least two temperature sensors, which are disposed at different locations in the catalytic converter, one after the other in terms of the direction of the flowing exhaust gas. The measuring sensors may both be disposed outside the catalytic converter, with a first sensor upstream of an inlet end of the catalytic converter and a second sensor downstream of an outlet end of the catalytic converter. German Published, Non-Prosecuted Application 26 43 739 A1 also provides for at least one measuring sensor in the interior of the catalytic converter. Those two references also propose to form a signal from the sensor measurement signals that corresponds to the difference in the temperatures ascertained by the measurement sensors, and to use that signal to evaluate the function of the catalytic converter. In Published European Application No. 0 236 659 A1, an evaluation system for the signals of the measurement sensors is presented. The evaluation system issues a warning signal if the temperature difference exceeds a certain first limit value, and a signal warning of permanent damage if the temperature difference exceeds a second limit value, which is markedly above the first limit value. German Published, Non-Prosecuted Application 26 43 739 A1 also proposes disposing two temperature measuring sensors directly next to one another in the vicinity of the outlet end of the catalytic converter. A first sensor has a catalytically active surface, but a second sensor has a catalytically inactive surface. With such a measurement configuration, it is possible to ascertain if the exhaust gas flowing past the measuring sensors still contains any convertible pollutants. If so, that would cause the two measuring sensors to signal different temperatures.

The prior art offers few suggestions for achieving safe and reliable functional monitoring of a catalytic converter with a view toward aging and poisoning processes. In particular, with the known systems, it is not possible to make a statement as to the status (in terms of aging and/or poisoning) of the catalytic converter that is still functioning adequately overall. Recourse must always be made to very indirect measurement values, such as the temperature of the fluid to be catalyzed before reaching the catalytic converter or after passing through it. Furthermore, the only measurement values that are evaluated are those that were obtained only at certain points on the catalyst and therefore, if for no other reason than because of the generally extremely nonhomogeneous impingement of the fluid to be catalyzed upon the catalytic converter, they are only very limitedly capable of providing accurate information. Additionally, the measurement values typically obtained are highly dependent on the particular strain on the catalytic converter. In order to obtain more reliable statements regarding the status of the catalytic converter, they must necessarily be analyzed in the light of other data. Such data include information that indicate the status of the fluid passing through the catalytic converter, such as the temperature, flow velocity, and content of catalyzable components, for instance.

SUMMARY OF THE INVENTION

It is accordingly an object of the invention to provide a method for monitoring the function of a catalytic converter through which a catalyzable fluid can flow and a catalytic converter for performing the method, which overcome the hereinafore-mentioned disadvantages of the heretofore-known methods and devices of this general type, in which the method uses temperature measurements that permit reliable statements as to the functional capability of the catalytic converter to be made as directly as possible and without taking other data into account and in which the catalytic converter is especially suitable for performing the method of the invention.

With the foregoing and other objects in view there is provided, in accordance with the invention, a method for monitoring the status of a catalytic converter through which a catalyzable fluid, particularly an exhaust gas from an internal combustion engine, flows along a flow direction from an inlet end to an outlet end, which comprises measuring the temperature of the catalytic converter, continuously or at a plurality of measuring points, along the flow direction forming a mean temperature value; measuring the temperature of the catalytic converter at least at one measurement point forming an associated local temperature value; and comparing the mean temperature value with the local temperature value for deriving a statement as to the status of the catalytic converter.

For the first time, the invention permits a comprehensive assessment of the form of the temperature distribution in the interior of a catalytic converter, without requiring recourse to absolute temperature measurement variables, which as mentioned are highly dependent on the particular operating status of the catalytic converter or on the engine associated with the catalytic converter.

There are several options for this purpose: A local temperature value can, for instance, be determined in the vicinity of the inlet end of the catalytic converter. Comparing this local value with the mean temperature value furnishes a statement as to the region in the catalytic converter in which the catalytic conversion is in fact occurring. If the catalytic reaction is primarily taking place in the vicinity of the outlet end, then the mean value is approximately equal to the local value, while if the conversion is already occurring in the vicinity of the inlet end, then the local value and the mean value are markedly different from one another. The local value can also be determined in the vicinity of the outlet end of the catalytic converter, for instance. If the catalytic reaction is occurring substantially in the vicinity of the outlet end, the mean value and local value are greatly different from one another, while for a catalytic reaction that is already in the vicinity of the inlet end, they are substantially in agreement. In this way as well, a reliable statement as to the functional capability of the catalytic converter is obtained. For example, it is especially valuable to form local temperature values both in the region of the inlet end and in the region of the outlet end. Then the aforementioned evaluations can first be combined with one another. Moreover, a comparison may be made of the mean temperature value with the mean value of the local values. If the catalytic reaction is already taking place in the vicinity of the inlet end, then the mean temperature value is markedly higher than the mean value of the local temperature values, while if the catalytic converter has largely lost its function, then the catalytic reaction which is then weak proceeds substantially uniformly over the entire length of the catalytic converter, and correspondingly, the mean temperature value is equal to the mean value of the local temperature values. Correspondingly, the quotient of the mean temperature value and the mean value of the local temperature values represents a valuable criterion, which at least in a first approximation is not dependent on operation, for evaluating the functional capability of the catalytic converter.

In order to attain a maximally operation-independent criterion for evaluating the functional capability of the catalytic converter, the temperature measurements may also be carried out in such a way that the signals of the temperature measuring sensors are integrated over a measurement interval of acceptable magnitude, such as approximately one hour or several hours. In this way, problems in measurement resulting from measurement signals that are picked up during temporally unstable conditions in the catalytic converter, such as if the catalyzable fluid alters in terms of its chemical composition, its flow velocity or its temperature, can be suppressed.

In accordance with another mode of the invention, there is provided a method which comprises not making every temperature measurement in a highly localized region at right angles to the flow direction, but rather over an extended segment of the catalyst extending at right angles to the flow direction. In this way, a nonhomogeneous flow through the catalytic converter can be taken into account to a certain extent, and the result is measurement values that are independent of the specific type of impingement on the catalytic converter and thus are reliably replicable from one catalytic converter to another.

In accordance with a further mode of the invention, there is provided a method which comprises avoiding impairments to the status monitoring, such as those that occur upon engine load changes, for instance, in the following manner: Upon a load change, parameters such as the chemical composition, flow velocity and temperature of the catalyzable fluid are changed. Since the catalytic converter has a certain thermal inertia, several seconds may pass under some circumstances until the temperature distribution in the catalytic converter has adapted to the altered operating conditions. Correspondingly, measurements upon load changes may under some circumstances lead to incorrect statements regarding the function of the catalytic converter. In order to avoid that, both the mean temperature value and the local temperature value are each determined over a certain time interval, and the course of the measurement values over time is recorded. The derivation of a statement regarding the status of the catalytic converter is not made unless the changes over time in the mean temperature value and the local temperature value are both below a predetermined limit value.

In accordance with an added mode of the invention, there is provided a method which comprises assuring that the statement regarding the status of the catalytic converter is always up to date by performing each temperature measurement continuously or adapting it to typical electronic signal processing, quasi-continuously.

With the objects of the invention in view, there is also provided an assembly for monitoring the status of a catalytic converter through which a catalyzable fluid can flow along a flow direction from an inlet end to an outlet end of the catalytic converter, comprising a first temperature measuring sensor including a length of wire having a temperature-variable electrical resistance and being coupled to the catalytic converter along the flow direction; and at least one second temperature measuring sensor being coupled to the catalytic converter at a measuring point.

Such a catalytic converter can be manufactured especially simply, for instance by threading the length of wire forming the first temperature measuring sensor into a channel of the honeycomb body forming the catalytic converter and anchoring the second temperature measuring sensor likewise in a channel of the honeycomb body. If the honeycomb body is produced by winding or intertwining metal sheets, then the temperature measuring sensors can be incorporated into the catalytic converter during manufacture.

In accordance with another feature of the invention, the length of wire forming the first temperature measuring sensor is shaped into a hairpin loop before being installed in the catalytic converter, so that the inductive resistance of the first temperature measuring sensor can be kept low and any impairment to the measurement system to be connected to the catalytic converter is avoided.

In accordance with a further feature of the invention, the first temperature measuring sensor is disposed in the inside of the catalytic converter.

In accordance with an added feature of the invention, if the catalytic converter has a center line that is approximately parallel to the flow line, the sensor is aligned approximately parallel to the center line, or it is disposed approximately helically about the center line in order to attain a certain averaging over segments of the catalytic converter at right angles to the flow direction. In the aforementioned catalytic converters including metal sheets, this can be performed especially simply by incorporating the measuring sensor into the catalytic converter in the process of the winding or intertwining.

In accordance with an additional feature of the invention, the first temperature measuring sensor is disposed on a jacket surface of the catalytic converter that joins the inlet end to the outlet end, or in the immediate vicinity of the jacket surface in the interior of the catalytic converter. In accordance with yet another feature of the invention, the second temperature measuring sensor is disposed on the jacket surface or in the immediate vicinity of the jacket surface in the interior of the catalytic converter.

In the case of conventional cylindrical catalytic converters, the jacket surface is precisely the cylindrical jacket. As will be described in further detail in conjunction with the drawing, the disposition of temperature measuring sensors on or in the immediate vicinity of the jacket surface makes it possible to a certain extent to localize the segment of the catalytic converter in which the catalytic reaction for the most part takes place. Measuring the temperature of the jacket surface, and in particular measuring it with a first temperature measuring sensor and a second temperature measuring sensor on the jacket surface, or in the immediate vicinity of the jacket surface in the interior of the catalytic converter, therefore makes it possible to evaluate the status of the catalytic converter largely independently of operation. If the catalytic reaction is taking place in the vicinity of the inlet end, then the catalytic converter is functionally capable without limitation. If the catalytic reaction shifts to the vicinity of the outlet end, preparation must be made for failure of the catalytic converter.

In accordance with yet a further feature of the invention, the second temperature measuring sensor is an approximately circularly bent or spirally wound length of wire, preferably constructed as a hairpin loop, with a temperature-variable electrical resistance. The first temperature measuring sensor and the second temperature measuring sensor are thus identically constructed, and they therefore permit measurements that are free of systematic errors such as are caused if the measuring sensors have different properties.

In accordance with yet an added feature of the invention, a second temperature measuring sensor is disposed in the vicinity of the inlet end and in the vicinity of the outlet end. In accordance with a concomitant feature of the invention, the first temperature measuring sensor is extended substantially from the inlet end to the outlet end.

It is especially advantageous to provide both a second temperature measuring sensor on the inlet end and a second temperature measuring sensor on the outlet end. In each case, it is advisable to provide the position of the second temperature measuring sensor at the beginning or end of the measuring path defined by the first temperature measuring sensor, and this path is in turn advantageously the entire length of the catalytic converter. When measuring over the entire catalytic converter, the broadest possible evaluation of the status of the entire catalytic converter can be made.

Other features which are considered as characteristic for the invention are set forth in the appended claims.

Although the invention is illustrated and described herein as embodied in a method for monitoring the function of a catalytic converter through which a catalyzable fluid can flow and an assembly for monitoring the status of the catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
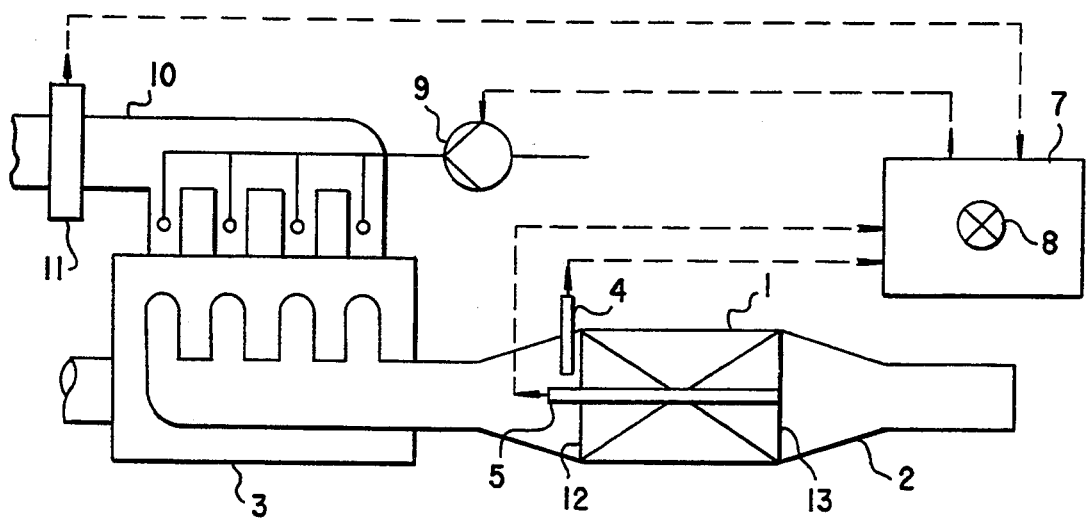
FIG. 1 is a fragmentary, diagrammatic, plan view of a configuration with an internal combustion engine, an exhaust system and a catalytic converter.

Referring now in detail to the figures of the drawing, in which components that function the same are each provided with the same reference numeral in order to simplify the description, and first, particularly, to FIG. 1 thereof, there is seen a diagrammatic illustration of an internal combustion engine 3 with an exhaust system 2 in which a catalytic converter 1 is located. The catalytic converter 1 is provided with first and second respective temperature measuring sensors 5, 4 which, by way of example, may be thermocouples or temperature-variable electrical resistors. The temperature measuring sensors 4, 5 are connected to an engine monitoring system 7, for example a suitably expanded electronic engine control unit, which receives all of the measuring data necessary for operating the engine 3 and processes them further. Disposed in the engine monitoring system 7 is an apparatus with which the method of the invention for monitoring the state of the catalytic converter 1 through which exhaust gas flows, is performed during operation of the engine 3. The statement that the engine monitoring system 7 is intended to make, for example in the event that the catalytic converter 1 is severely aged, as a rule includes the activation of an indicator 8, such as a control light. Naturally, it is also possible for the statement to be further processed in some other way, and in an extreme case, for instance, it is possible for further operation of the engine 3 to be prevented entirely. In order to control the operation of the engine 3, the engine monitoring system 7 receives the necessary data from appropriate transducers in the engine 3. By way of example, FIG. 1 shows the fresh gas system 10 for delivering uncombusted air to the engine 3, which is provided with an air flow rate meter 11 that determines the flow rate of the air flowing to the engine 3 and informs the engine monitoring system 7 of it. For the sake of simplicity, no other measurement pickups are shown. In particular, as a rule there are devices present for measuring the operating frequency (or the rpm) of the engine 3, and so forth. The control functions of the engine monitoring system include fuel metering, for instance. Accordingly, a fuel pump 9 can be influenced by the engine monitoring system 7. For the sake of simplicity, an ignition system for the engine 3 is not shown, but its necessity is self-evident and therefore no further comment on it is needed. In FIG. 1, the second temperature measuring sensor 4 provided for the catalytic converter 1 is disposed upstream of an inlet end 12, at which the exhaust gases leaving the engine 3 flow into the catalytic converter 1. The first temperature measuring sensor 5 is located in the interior of the catalytic converter 1 and in the present example it is in the middle. Without substantially impairing the function of the second temperature measuring sensor 4, this sensor may also be disposed in the interior of the catalytic converter 1, in the vicinity of the inlet end 12. The first temperature measuring sensor 5 extends through the catalytic converter 1 from the inlet end 12 to an outlet end 13. The structural layout of the temperature measuring sensor and its incorporation into the catalytic converter 1 are not that critical. The first measuring sensor 5 need not necessarily be located in the middle of the catalytic converter 1, nor need it be straight (for example, depending on the construction of the catalytic converter 1, a spiral version would be conceivable). Moreover, as in the case shown, temperature measuring sensors 4, 5 having certain three-dimensional extensions at right angles to the direction of the flowing exhaust gas are entirely advantageous. In general, the impingement of exhaust gas on a catalytic converter 1 is markedly unhomogeneous at right angles to the direction of flow of the exhaust gas, and by using "extended" temperature measuring sensors 4, 5, findings regarding conditions that are averaged over certain regions of the catalytic converter 1 are achieved, which are more replicable and better transmissible than findings regarding conditions that are strictly limited in three-dimensional terms. Temperature measuring sensors 4, 5 extended at right angles to the flow direction of the exhaust gas can be provided in simple fashion in catalytic converters 1 having honeycomb-like carrier bodies which are wound or intertwined from metal sheets in a known manner: The resistor wires for forming the temperature measuring sensors 4, 5 are simply placed between the sheets before the sheets are wound or intertwined.

Figure 2:
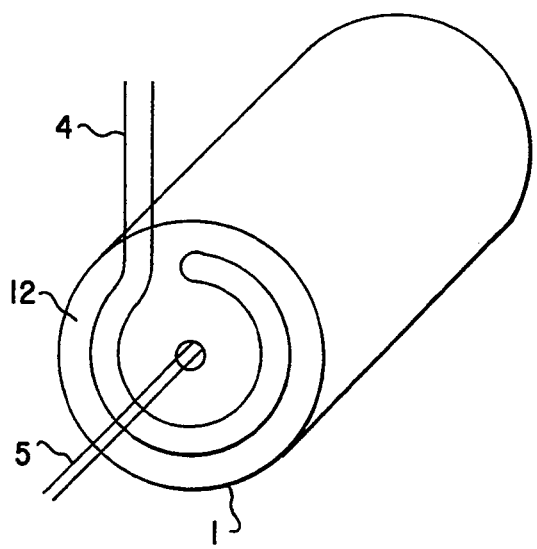
FIGS. 2 and 3 are perspective views of examples of the way in which a catalytic converter that is monitorable can be achieved with temperature measuring sensors according to the invention.

FIG. 2 shows a special embodiment of the catalytic converter 1 that is shown diagrammatically in FIG. 1. Both temperature measuring sensors 4, 5 are constructed as loop-like resistor wires, having an electrical resistance that is temperature-dependent in each case. The second temperature measuring sensor 4 is placed on the inlet end 12 of the catalytic converter 1 and secured to it, or it is mounted in some other way in the immediate vicinity of the inlet end 12. The first measuring sensor 5 extends within the interior of the catalytic converter 1.

Figure 3:
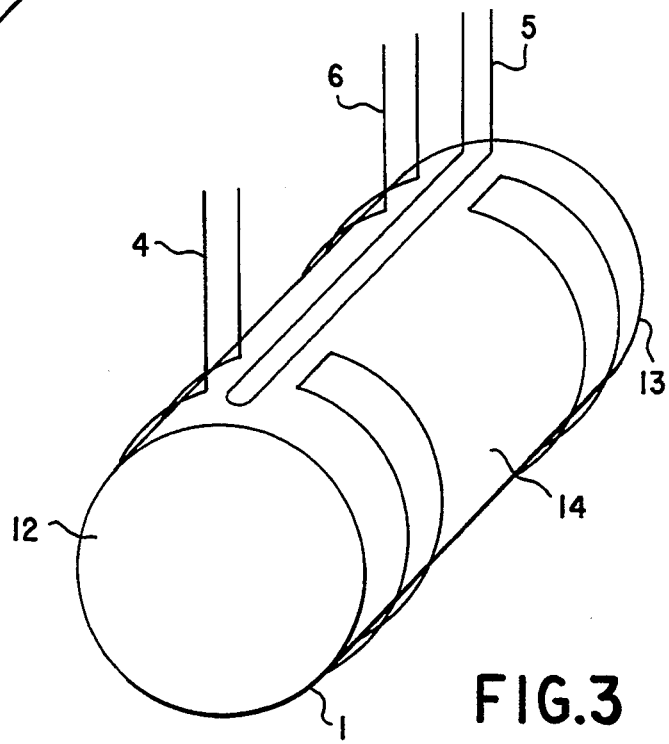

A version of a catalytic converter 1 with temperature measuring sensors 4, 5, 6 that in principle is similar to the configurations of FIGS. 1 and 2 is shown in FIG. 3. Firstly, the first temperature measuring sensor 5 is not located inside the catalytic converter 1 but rather is it mounted on a jacket surface 14. The same is true for the second temperature measuring sensor 4 that is mounted near the inlet end 12 and a second temperature measuring sensor 6 that is mounted near the outlet end 13. The version of FIG. 3 is especially advantageous because it does not require any alterations in the interior of the catalytic converter 1. It is especially advantageous in a catalytic converter 1 having a metal carrier body, which typically already has a solid jacket tube having an outer surface that forms the jacket surface 14. Resistor wires can easily be secured on such a catalytic converter 1 and can easily be replaced in the event of damage. The second temperature measuring sensors 4 and 6 are each wound on the jacket surface 14, in the vicinity of a respect end of the catalytic converter 1. Simple hairpin loops of resistor wires are shown for all three temperature measuring sensors 4, 5, 6. Naturally, the hairpin loops may be replaced with other types of windings, especially if longer wire lengths are necessary, without impairing the function.

Figure 4:
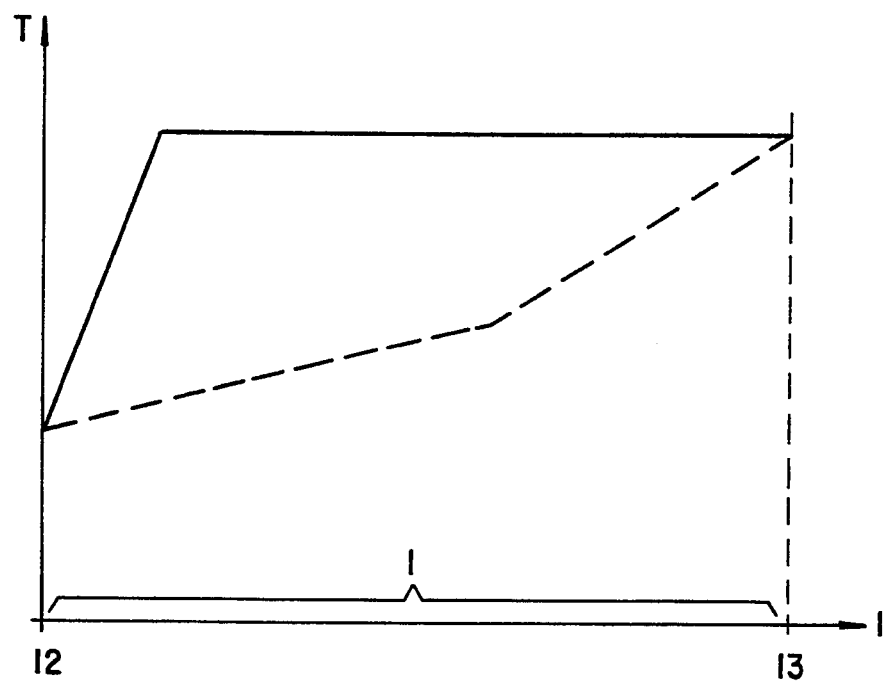
FIG. 4 is a graph of a temperature distribution in an interior of a catalytic converter during operation.

FIG. 4 shows a temperature distribution in the interior of a catalytic converter 1 in steady-state operation. A path extending from the inlet end 12 to the outlet end 13 through the catalytic converter 1 is shown on the abscissa, and the applicable temperature is plotted along the ordinate. The temperature of the exhaust gas flowing into the catalytic converter must have a value that is above the minimum temperature required for operation of the catalytic converter 1. The curve shown in solid lines represents the course of the temperature for a relatively new catalytic converter 1. Immediately downstream of the inlet end 12 (corresponding to the zero point in the diagram), the temperature rises very quickly and soon attains a maximum value which remains approximately constant as far as the outlet end 13, depending on the thermal conductivity of the catalytic converter 1 and on the thermal transfer mediated by the flowing exhaust gas. The curve shown in dashed lines represents the course of the temperature for a greatly aged catalytic converter 1. The temperature only slowly rises from the inlet end 12. The activity of the regions of the catalytic converter 1 directly downstream of the inlet end 12 has dropped very sharply, although it does not entirely disappear. It is not until regions in the vicinity of the outlet end 13 that a pronounced temperature increase occurs, because there is still activity there. In the context of a configuration of temperature measuring sensors in the form of resistor wires shown in FIG. 1 or FIG. 2, the second temperature measuring sensor 4 would measure the temperature of the catalytic converter at the inlet end 12. The first measuring sensor 5 measures a temperature value which is averaged over the entire length of the catalytic converter 1, corresponding to the integral of the curve shown in FIG. 4. If the catalytic converter 1 is fully functional, then the second temperature measuring sensor 4 and the first temperature measuring sensor 5 would measure temperatures that differ markedly from one another. If the aging of the catalytic converter 1 is advanced, then the first measuring sensor 5 measures substantially the same temperature as the second measuring sensor 4. The temperature difference that accordingly occurs is a measure for the aging of the catalytic converter 1. It is initially high and drops if the catalytic converter 1 loses activity over its length, and in the extreme case, if the catalytic converter 1 has completely lost its activity, there is no longer any temperature difference. The status of the catalytic converter 1 must be considered insufficient as soon as the temperature difference, which is possibly corrected for influences resulting from the special operating state of the engine, drops below a limit value to be selected. With a second temperature measuring sensor 4 disposed in the vicinity of the outlet end 13, functional monitoring of the catalytic converter 1 is also possible. If the catalytic converter 1 is substantially fully functional, then such a second temperature measuring sensor 4 and the first temperature measuring sensor 5 would measure essentially identical temperatures. With progressive aging of the catalytic converter 1, the first measuring sensor 5 measures a markedly lower temperature than the second measuring sensor 4 located on the outlet end 13. The temperature difference that accordingly occurs is also a measure for the aging and/or poisoning of the catalytic converter 1. It is initially slight, it rises as use increases, and it finally drops again, if the catalytic converter 1 has lost activity over its entire length. If there is a complete loss of activity, there is no longer any temperature difference. Accordingly, the status of the catalytic converter 1 must be considered insufficient as soon as the temperature difference, that is possibly corrected for influences resulting from the special operating state of the engine, has passed its maximum.

Figure 5:
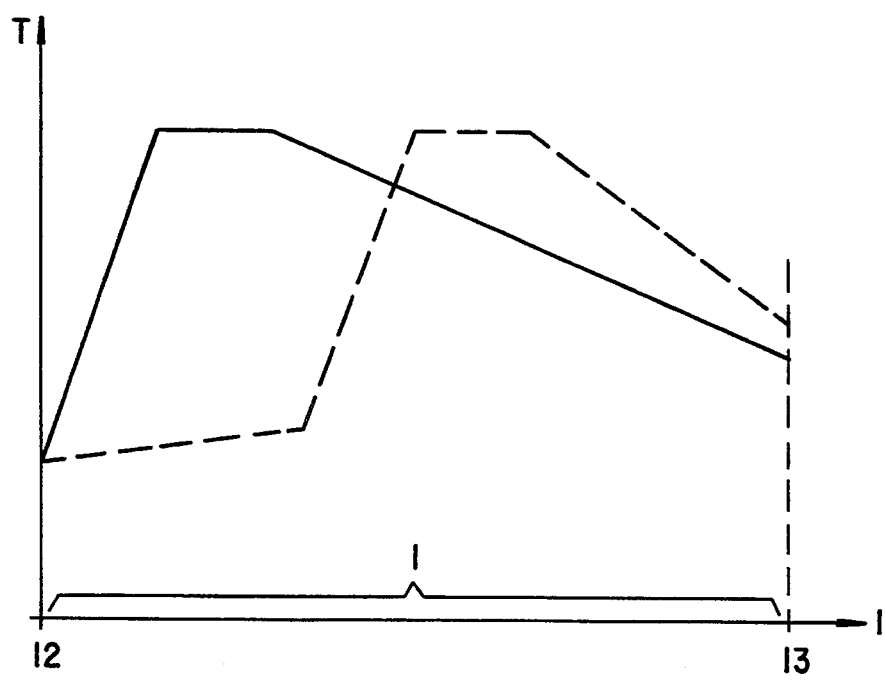
FIG. 5 is a graph of the temperature distribution over a jacket surface of a catalytic converter during operation.
Figure 6:
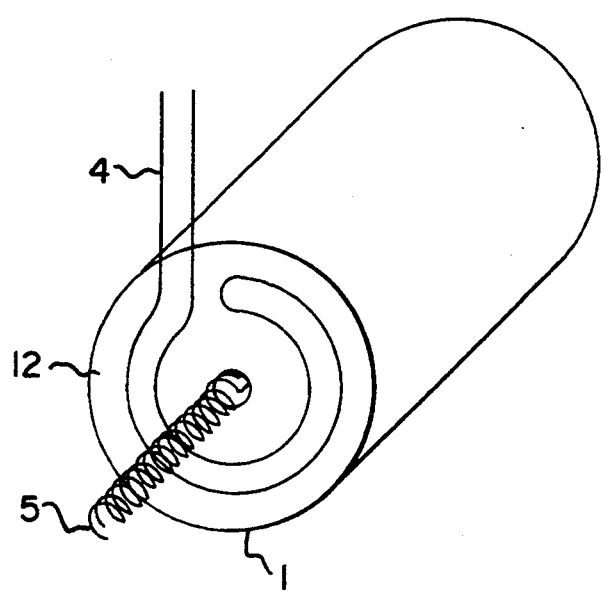
FIG. 6 is a view similar to FIG. 2 of a further embodiment of a temperature measuring sensor.

FIG. 5 shows the course of the temperature on the jacket of the catalytic converter 1, with the graph being laid out as in FIG. 4. An essential feature is that after reaching its maximum, the temperature does not remain substantially constant, but instead decreases again downstream of the zone of the catalytic converter 1 in which the catalytic reaction primarily occurs. This can be ascribed primarily to heat losses from radiation. Downstream of the active zone, no further heat development takes place, and therefore the heat radiated away there cannot be replaced. Correspondingly, monitoring can also be performed in such a way that the location of the zone of the highest temperature on the jacket, or in its vicinity in the interior of the catalytic converter 1, is determined. In the context of the invention, this is performed by way of example with a configuration according to FIG. 3.

Through the use of the invention, opportunities for monitoring a catalytic converter through which a catalyzable fluid can flow are disclosed by means of temperature measurements that make it possible in an uncomplicated way to evaluate temperature distributions, which are dependent to a substantially lesser extent than localized temperature measurement values on the specific operating conditions of the catalytic converter, and which accordingly make complicated provisions for evaluating the measurements unnecessary.

We claim:

1. A method for monitoring the status of a catalytic converter with a honeycomb body through which a catalyzable fluid flows along a flow direction from an inlet end to an outlet end, which comprises:
    a) measuring the temperature of the catalytic converter honeycomb body at a plurality of measurement points along the flow direction and forming a means temperature value from the temperature measured at the plurality of measurement points;
    b) measuring the temperature of the catalytic converter honeycomb body at least at one measurement point forming an associated local temperature value; and
    c) comparing the mean temperature value with the local temperature value for deriving an indication as to the status of the catalytic converter.

2. The method according to claim 1, which comprises conducting an exhaust gas from an internal combustion engine through the catalytic converter.

3. The method according to claim 1, which comprises defining the plurality of measurement points continuously along the flow direction to form the mean temperature value.

4. The method according to claim 1, further measuring the temperature of a thin segment of said catalytic converter extending perpendicular to the flow direction.

5. The method according to claim 1, which comprises:
    a) determining the mean temperature value and the local temperature value over a time interval;
    b) monitoring the variations of the mean temperature value and the local temperature value over time;
    c) deriving the indication as to the function of the catalytic converter only if the variations over time of the mean temperature value and the local temperature value are below a predetermined limit value.

6. The method according to claim 5, which comprises performing each temperature measurement continuously during the time interval.

7. An assembly for monitoring the status of a catalytic converter through which a catalyzable fluid can flow along a flow direction from an inlet end to an outlet end of the catalytic converter, comprising:
    a) a first temperature measuring sensor including a length of wire having a temperature-variable electrical resistance and being coupled to the catalytic converter along the flow direction; and
    b) at least one second temperature measuring sensor being coupled to the catalytic converter at a measuring point.

8. The assembly according to claim 7, wherein said length of wire of said first temperature measuring sensor is shaped into a hairpin loop.

9. The assembly according to claim 7, wherein said first temperature measuring sensor is disposed in the catalytic converter.

10. The assembly according to claim 9, wherein the catalytic converter has a center line being approximately parallel to the flow direction, and said first temperature measuring sensor is disposed approximately parallel to the center line.

11. The assembly according to claim 9, wherein the catalytic converter has a center line being approximately parallel to the flow direction, and said first temperature measuring sensor is disposed approximately helically about the center line.

12. The assembly according to claim 7, wherein the catalytic converter has a jacket surface connecting the inlet end to the outlet end, and said first temperature measuring sensor is disposed on the jacket surface.

13. The assembly according to claim 12, wherein said second temperature measuring sensor is disposed on the jacket surface.

14. The assembly according to claim 7, wherein the catalytic converter has a jacket surface connecting the inlet end to the outlet end, and said first temperature measuring sensor is disposed in the immediate vicinity of the jacket surface in the interior of the catalytic converter.

15. The assembly according to claim 14, wherein said second temperature measuring sensor is disposed on the jacket surface.

16. The assembly according to claim 7, wherein said second temperature measuring sensor includes a length of wire being wound approximately spirally.

17. The assembly according to claim 7, wherein said second temperature measuring sensor includes a length of wire being bent into a hairpin loop.

18. The assembly according to claim 7, wherein said second temperature measuring sensor is disposed in the vicinity of the inlet end.

19. The assembly according to claim 7, wherein said second temperature measuring sensor is disposed in the vicinity of the outlet end.

20. The assembly according to claim 7, wherein said first temperature measuring sensor is extended substantially from the inlet end to the outlet end.

* * * * *